US010763702B2

(12) United States Patent
Logan et al.

(10) Patent No.: US 10,763,702 B2
(45) Date of Patent: Sep. 1, 2020

(54) WIRELESS RADIO POWER ADAPTER DEVICE

(71) Applicant: The Government of the United States of America, as represented by the Secretary of the Navy, Arlington, VA (US)

(72) Inventors: John T. Logan, Alexandria, VA (US); Rick W. Kindt, Arlington, VA (US)

(73) Assignee: The Government of tha United States of America, as represented by the Secretary of the Navy, Washington, DC (US)

(*) Notice: Subject to any disclaimer, the term of this patent is extended or adjusted under 35 U.S.C. 154(b) by 102 days.

(21) Appl. No.: 15/983,511

(22) Filed: May 18, 2018

(65) Prior Publication Data

US 2018/0337563 A1    Nov. 22, 2018

Related U.S. Application Data

(60) Provisional application No. 62/507,880, filed on May 18, 2017.

(51) Int. Cl.
*H02J 50/20* (2016.01)
*H02J 7/02* (2016.01)
*B60L 53/30* (2019.01)
*B60L 53/12* (2019.01)

(52) U.S. Cl.
CPC .............. *H02J 50/20* (2016.02); *B60L 53/12* (2019.02); *B60L 53/30* (2019.02); *H02J 7/025* (2013.01)

(58) Field of Classification Search
CPC .... H02J 7/02; H02J 7/025; H02J 5/005; H02J 50/10; H02J 50/12; H02J 50/20; H02J 50/60; H02J 50/80; H02J 50/90
USPC ...................... 307/104, 9.1, 10.1, 66, 64, 80
See application file for complete search history.

(56) References Cited

U.S. PATENT DOCUMENTS

| | | | |
|---|---|---|---|
| 2011/0095618 A1* | 4/2011 | Schatz | H02J 50/90 307/104 |
| 2011/0095687 A1* | 4/2011 | Jonsson | F21K 9/232 315/51 |
| 2011/0098953 A1* | 4/2011 | Jonsson | G06F 1/3209 702/62 |
| 2012/0070153 A1* | 3/2012 | Jonsson | F21V 33/0076 398/115 |
| 2015/0295309 A1* | 10/2015 | Manry, Jr. | H01Q 1/48 342/374 |
| 2016/0185291 A1* | 6/2016 | Chamberlin | G01S 19/42 701/70 |
| 2017/0244455 A1* | 8/2017 | Urzhumov | H04B 7/046 |

(Continued)

*Primary Examiner* — Rexford N Barnie
*Assistant Examiner* — Jagdeep S Dhillon
(74) *Attorney, Agent, or Firm* — US Naval Research Laboratory; William Ladd (57) ABSTRACT

Systems and methods are provided for enabling ambient radio frequency (RF) energy to be harvested with a device. In an embodiment, wideband phased array antennas in the device efficiently harvest ambient RF energy over a broad electromagnetic spectrum, and circuitry adapts this RF energy into DC power for battery charging or energy storage. In an embodiment, the device is a modularly connected/ disconnected, passive, wireless RF-to-DC adapter accessory that can ultimately be used to supply power to an electric apparatus and/or transporter.

20 Claims, 7 Drawing Sheets

(56) References Cited

U.S. PATENT DOCUMENTS

| | | | | |
|---|---|---|---|---|
| 2017/0302228 A1* | 10/2017 | Vella-Coleiro | ......... | H03F 3/602 |
| 2018/0074152 A1* | 3/2018 | Bowden | ................... | G01S 3/043 |
| 2018/0331935 A1* | 11/2018 | Ross | ....................... | H04L 43/16 |
| 2019/0235003 A1* | 8/2019 | Paulsen | ................... | G01R 29/10 |

* cited by examiner

WIRELESS RADIO POWER ADAPTER DEVICE

CROSS REFERENCE TO RELATED APPLICATIONS

This application claims the benefit of U.S. Provisional Patent Application No. 62/507,880, filed on May 18, 2017, which is incorporated by reference herein in its entirety.

FIELD OF THE DISCLOSURE

This disclosure relates to power adapters, including wireless power adapters.

BACKGROUND

RF devices are conventionally charged by plugging them into wall outlets and/or by using batteries. Conventional batteries are charged with a line connection to a standard wall outlet power adapter. Power is continuously drained, limiting usage time, and wall outlets are not always available.

Methods for wirelessly charging RF devices have not been successful due to challenges such as limited available passive RF power and potentially hazardous amounts of power necessary to be transmitted over-the-air to overcome propagation losses. For example, for ambient harvesting, conventional RF harvesters require a high gain antenna (requiring a large surface area) and a high-power transmitter for wireless power transfer.

Further, in conventional power harvesting systems, the power harvester unit is inside the system to power the unit, limiting modularity and increasing the size of the device.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods that enable ambient radio frequency (RF) energy to be harvested using a wireless radio power adapter device. In an embodiment, wideband phased array antennas efficiently harvest ambient RF energy over a broad electromagnetic spectrum, and circuitry adapts this RF energy into direct current (DC) power for battery charging or energy storage. In an embodiment, the wireless radio power adapter device is a modularly connected/disconnected, passive, wireless RF-to-DC adapter accessory that can ultimately be used to supply power to an electric apparatus or transporter.

In an embodiment, the wireless radio power adapter device can include multiple modular RF panels that can be added into or subtracted out of the wireless radio power adapter device, enabling different size and power implementations depending on device requirements. In an embodiment, the energy exploited by an RF panel can penetrate clouds, fog, etc. and is less susceptible to weather and time of day than solar power.

2. Power Harvesting Using Ultrawideband Antennas

Previous methods for wirelessly charging RF devices have not been successful due to challenges such as limited available passive RF power. Antennas with enhanced bandwidth capabilities can enable harvesters to harvest more RF power and thus overcome limitations of prior systems. For example, ultrawideband antennas, such as Planar Ultrawideband Modular Antennas (PUMAs) can provide enhanced abilities for a RF harvester to harvest broadband signal sources.

For example, in an embodiment, an RF harvester can include broadband antenna elements configured to receive signals having greater than or equal to a 3:1 bandwidth ratio (i.e., signals having a high to low frequency ratio greater than or equal to 3). For example, these signals can include signals in the range of 1-3 GHz, 3-9 GHz, 7-21 GHz, etc. In an embodiment, an RF harvester can include broadband antenna elements configured to receive signals having greater than or equal to a 6:1 bandwidth ratio (i.e., signals having a high to low frequency ratio of 6). For example, these signals can include signals in the range of 1-6 GHz, 3-18 GHz, 3.5-21 GHz, etc.

Broadband operation enables more power capable of being received from different sources (e.g., a 6:1 bandwidth ratio, approximately 4.65 times more power available to be harvested than narrowband). Additionally, broadband reception enables the same average power to be received using lower-power incoming signals for human health benefits.

Further, in accordance with embodiments of the present disclosure, antenna elements (such as PUMA antenna elements) can be modular based on power requirements for a device to be charged. For example, in an embodiment additional antenna elements (e.g., subarrays) can be tiled into or out of a wireless radio power adapter device based on power requirements of the device to be charged. Adding additional antenna elements creates an electrically larger area with respect to the operating wavelength, leading to the ability to harvest more power. In an embodiment, each antenna subarray to be tiled can have the same characteristics (e.g., same size, shape, electrical performance, etc.). In an embodiment, each antenna subarray can have different characteristics (e.g., same size, shape, electrical performance, etc.). In an embodiment, RF panels (e.g., including ultrawideband antenna subarrays) can be mass produced, leading to modular, cost-effective ways of providing power to powered devices.

Embodiments of the present disclosure are high-performance, such that a device in accordance with an embodiment of the present disclosure can be broadband (e.g., 500-2.5 GHz, 3-21 GHz, etc.), polarization diverse, easily fabricated, low return-loss, high efficiency, matched to 50 ohms for the typical input impedance of AC-to-DC rectifiers, conformal, and low-profile (easily mounted on walls, vehicles, roofs, etc.).

3. Exemplary Wireless Radio Power Adapter Device Embodiments

Embodiments of the present disclosure provide modular, scalable, efficient systems and devices that can harvest and/or receive RF energy and can be tiled in a conformal assembly like a solar panel array. In an embodiment, the wireless radio power adapter device is an adapter for wireless RF power over-the-air to typical DC power. In an embodiment, the RF-to-DC rectification unit can use Schottky diodes. In an embodiment, the wireless radio power adapter device includes wideband, steerable antenna panels that can be modularly tiled based on different power requirements without disrupting performance.

In an embodiment, the wireless radio power adapter device includes a RF power harvester. In an embodiment, ambient RF energy, including varying frequencies and polarizations, is simultaneously collected through a passive array antenna. In an embodiment, the antenna is wideband and polarimetric. Collected RF energy can be selectively regulated as it is passed through signal regulator circuitry. Collected (and, in an embodiment, regulated) RF energy can enter a circuit responsible for conversion to direct-current (DC) power. Converted DC power can be used to supply the power reserve (bin) of an electric apparatus or transporter, which can be used for electronic functions.

Figure 1:
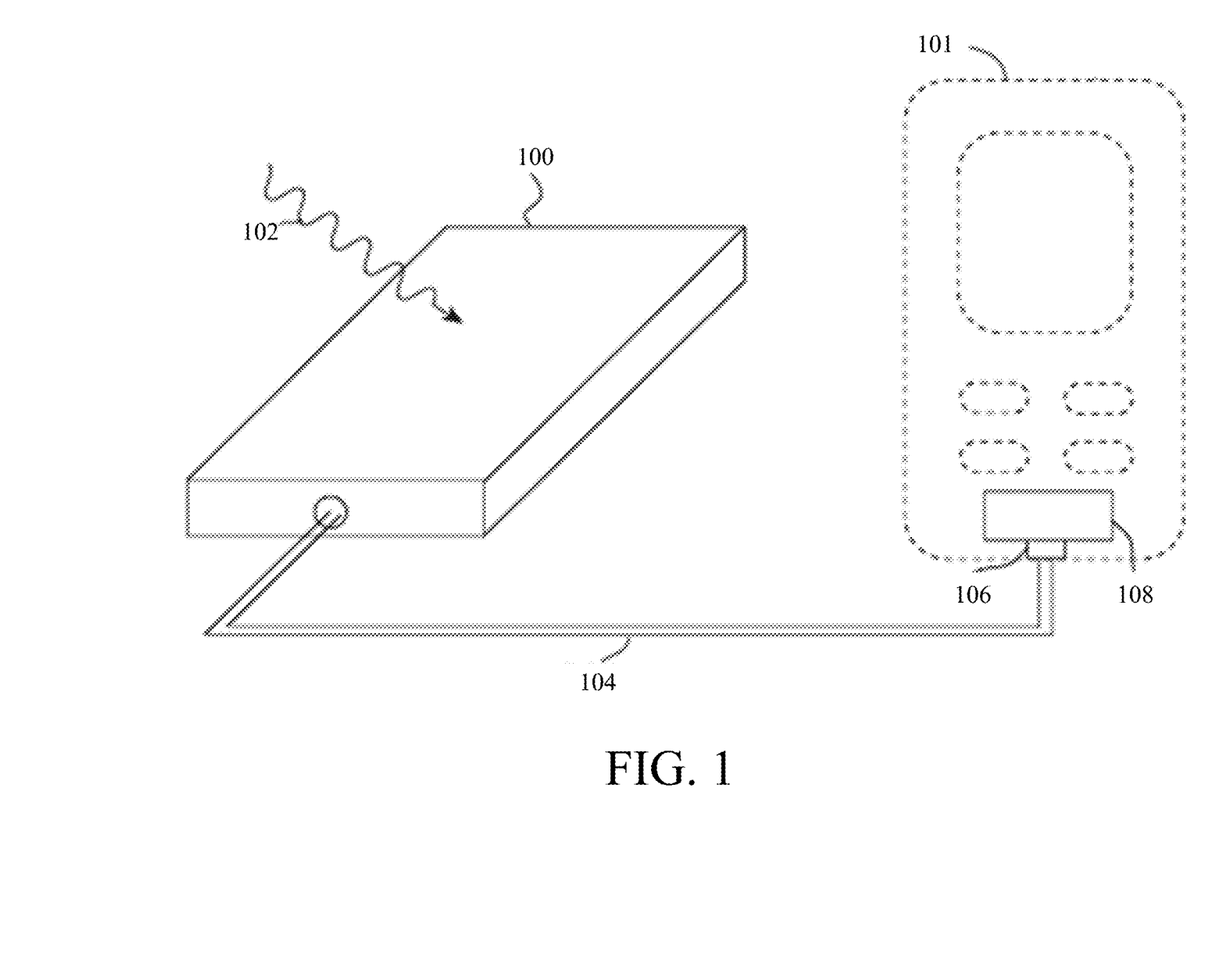
FIG. 1 is a diagram of a wireless radio power adapter device used to charge an electric apparatus in accordance with an embodiment of the present disclosure.

FIG. 1 is a diagram of a wireless radio power adapter device used to charge an electric apparatus in accordance with an embodiment of the present disclosure. In FIG. 1, wireless radio power adapter device 100 harvests power from RF signals 102 and uses this harvested power to charge electric apparatus 101 (e.g., a mobile phone). In an embodiment, wireless radio power adapter device 100 includes one or more antenna elements (e.g., in an embodiment, ultrawideband antenna element(s), such as PUMA(s)) enabling wireless radio power adapter device 100 to harvest power from broadband RF signals 102. In an embodiment, harvesting power from broadband RF signals 102 enables wireless radio power adapter device 100 to harvest far more power from different sources than conventional power harvesters.

In FIG. 1, wireless radio power adapter device 100 is coupled to electric apparatus 101 via a transmission channel 104. In FIG. 1, transmission channel 104 is shown as a wired link. However, it should be understood that, in accordance with embodiments of the present disclosure, transmission channel 104 can be a wireless transmission channel. In FIG. 1, transmission channel 104 couples to electric apparatus 101 via a power bin interface 106, which is coupled to a power bin 108. However, it should be understood that, in accordance with embodiments of the present disclosure, wireless radio power adapter device 100 can be configured to deliver power to electric apparatus 101 using a variety of methods.

Figure 2:
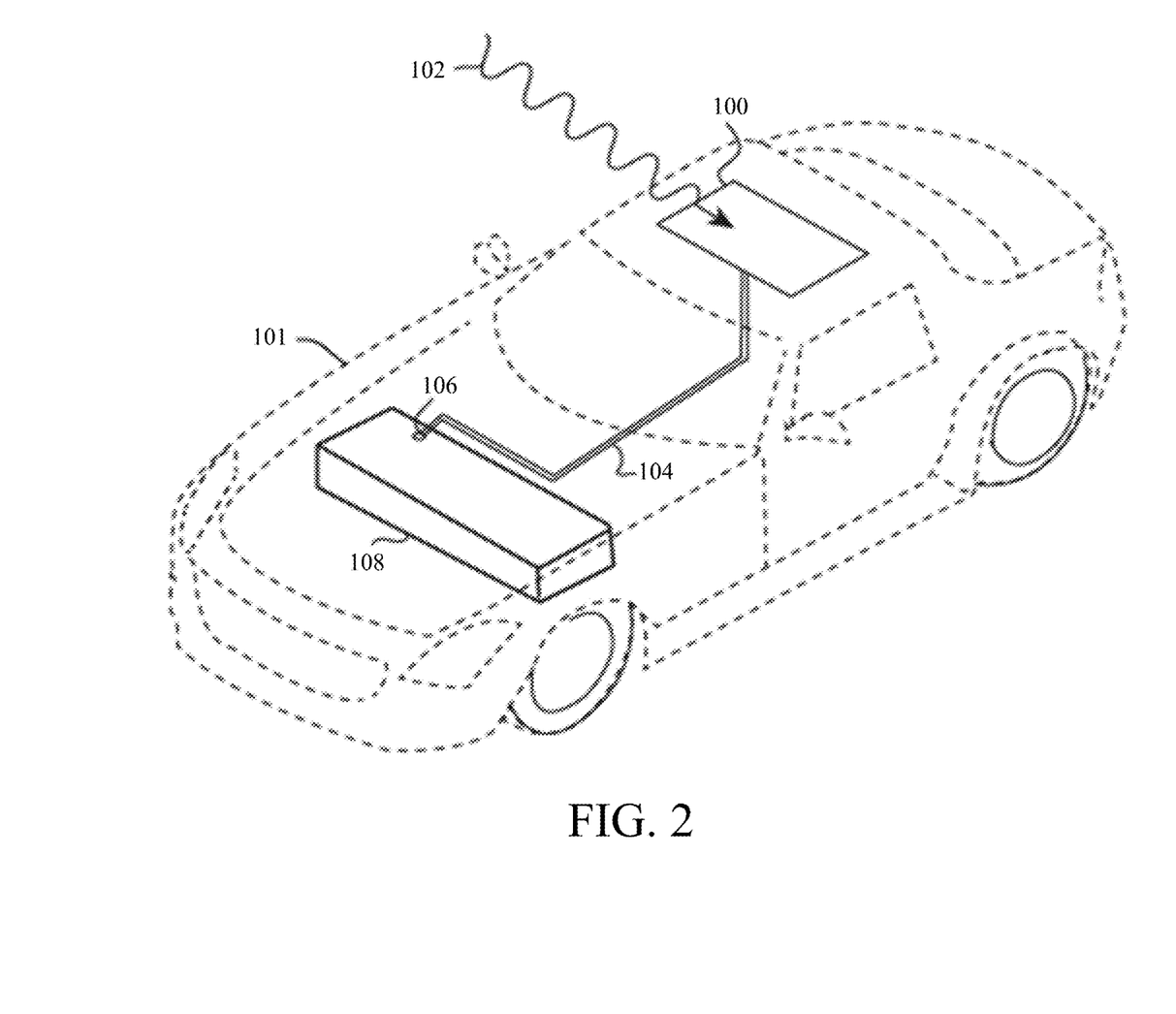
FIG. 2 is a diagram of a wireless radio power adapter device integrated into an electric device in accordance with an embodiment of the present disclosure.

FIG. 2 is a diagram of a wireless radio power adapter device integrated into an electric device in accordance with an embodiment of the present disclosure. In FIG. 2, electric apparatus 101 is a vehicle, and wireless radio power adapter device 100 is shown integrated into the vehicle 101. In FIG. 2, power bin 108 is a battery storing power to operate vehicle 101. For example, in an embodiment, wireless radio power adapter device 100 can harvest RF signals 102 and uses the harvested energy to charge the vehicle's battery 108.

For example, in an embodiment, electric apparatus 101 can be an unmanned transporter, such as an unmanned vehicle (e.g., an unmanned car or an unmanned aerial vehicle). Further, wireless radio power adapter device 100 can be configured to harvest ambient power or directed power. For example, in an embodiment, an unmanned transporter (e.g., as shown in FIG. 2) including a wireless radio power adapter device 100 in accordance with an embodiment of the present disclosure can be configured to receive power directed at the wireless radio power adapter device 100, harvest the directed power, and store the harvested power (e.g., in power bin 106). In an embodiment, power can be directed at wireless radio power adapter device 100 via any type of transmitter.

Figure 3:
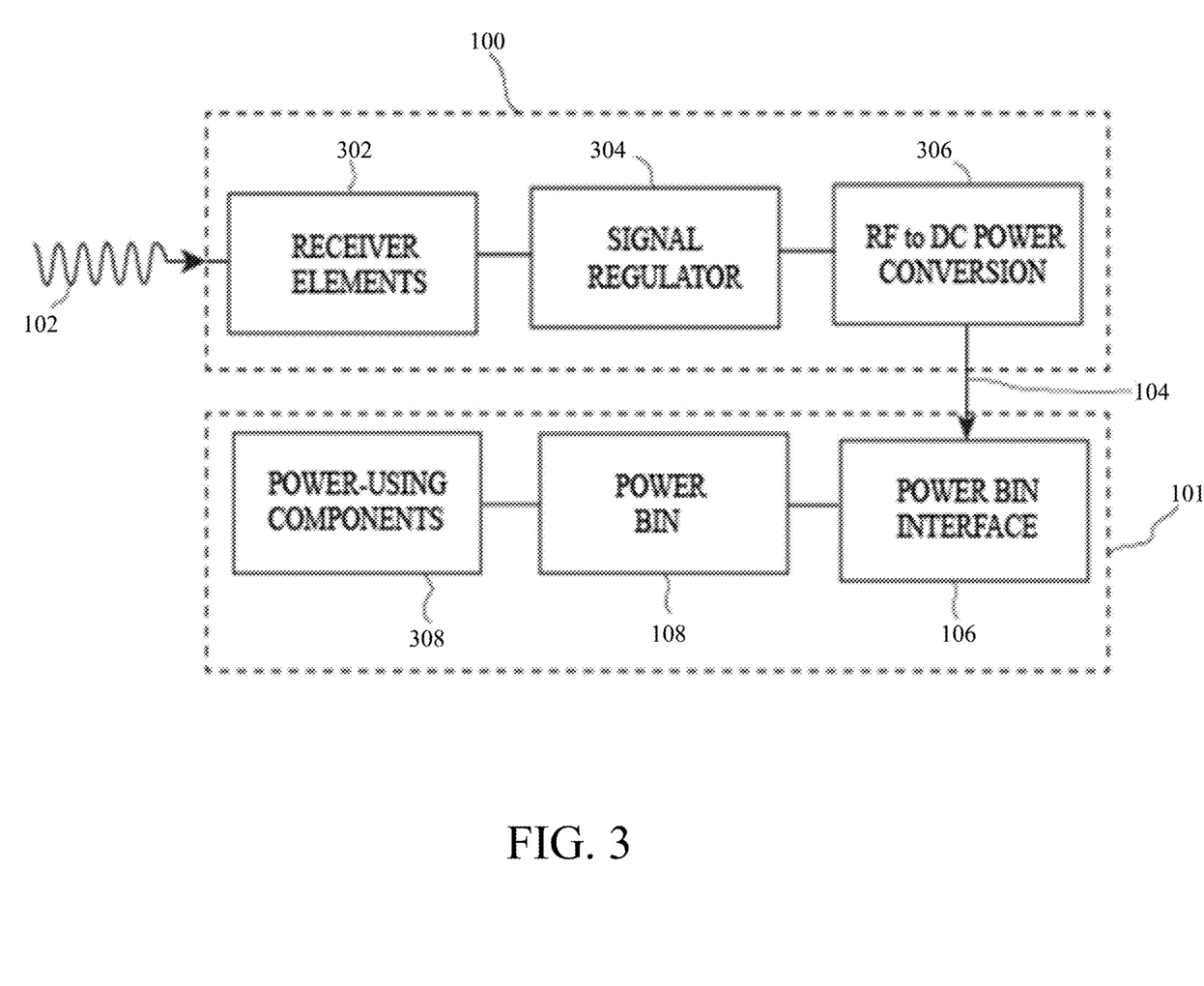
FIG. 3 is a diagram of exemplary components of a wireless radio power adapter device in accordance with an embodiment of the present disclosure.

FIG. 3 is a diagram of exemplary components of a wireless radio power adapter device in accordance with an embodiment of the present disclosure. In FIG. 3, wireless radio power adapter device 100 includes one or more receiver element(s) 302, signal regulator 304, and power converter 306 (e.g., in an embodiment a RF to DC power converter). In an embodiment, receiver elements 302 include one or more components configured to harvest power from RF signals 102 (an, in an embodiment, to generate a harvested signal). For example, in an embodiment, receiver elements 302 include one or more antenna elements (e.g., in an embodiment, ultrawideband antenna element(s), such as PUMA(s)) configured to harvest power from RF signals 102. In an embodiment, these antenna elements can be modular and can be adjusted based on power requirements of wireless radio power adapter device 100 and/or electric apparatus 101. For example, in an embodiment, the number of antenna element(s) in receiver elements 302 can be changed based on changing power requirements of power adapter device 100 and/or electric apparatus 101 (e.g., in an embodiment, antenna subarrays can be tiled in or tiled out of receiver elements 302).

In an embodiment, signal regulator 304 can be configured to filter out-of-band signals and/or interference received by receiver elements 302 (and, in an embodiment, to generate a filtered signal). In an embodiment, power converter 306 converts power to DC before sending it over transmission channel 104 to electric apparatus 101 (e.g., as a converted signal). While RF power is shown as being converted to DC in FIG. 3, it should be understood that RF power can be converted to a variety of power formats in accordance with embodiments of the present disclosure and that in some embodiments, no power converter 306 may be needed. In an embodiment, signal regulator 304 can be configured to perform beamforming (e.g., beam shaping) for signals received via receiver elements 302.

In FIG. 3, electric apparatus 101 includes power bin interface 106, power bin 108, and power-using components 308. In an embodiment, power using components 308 can include any systems, devices, and/or components of electric apparatus 101 that are configured to be powered using power harvested from power adapter device 100. For example, with reference to FIG. 2, power using components 308 can include parts of vehicle 101 configured to be powered by power from power bin 108.

Figure 4:
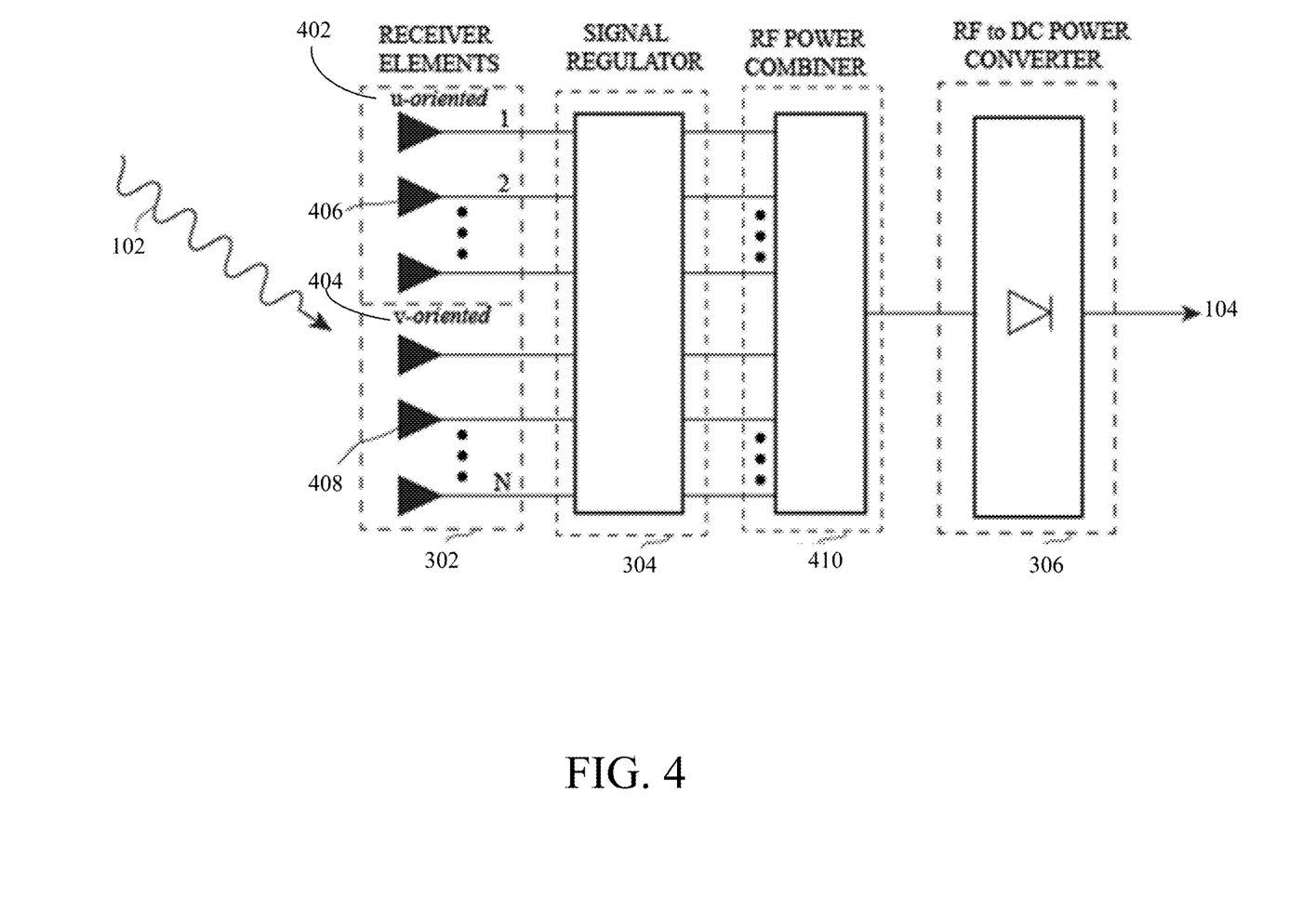
FIG. 4 is another diagram of exemplary components of a wireless radio power adapter device in accordance with an embodiment of the present disclosure.

FIG. 4 is another diagram of exemplary components of a wireless radio power adapter device in accordance with an embodiment of the present disclosure. In an embodiment, receiver elements 302 are polarization diverse and can be configured to sense arbitrary incoming polarizations. In FIG. 4, u-oriented signals and v-oriented signals represent signals with orthogonal orientations, and receiver elements 302 include receiver elements 402 for sensing u-oriented signals and receiver elements 404 for sensing v-oriented signals. For example, in an embodiment, receiver element 406 (e.g., an antenna) is configured to sense a u-oriented signal, and receiver element 408 (e.g., an antenna) is configured to sense a v-oriented signal.

In FIG. 4, wireless radio power adapter device 100 includes power combiner 410 (e.g., in an embodiment, a RF power combiner) in addition to power converter 306. In an embodiment, power combiner 410 is configured to combine multiple power signals (e.g., from signal regulator 304) into a single power signal to be sent to power converter 306.

Figure 5:
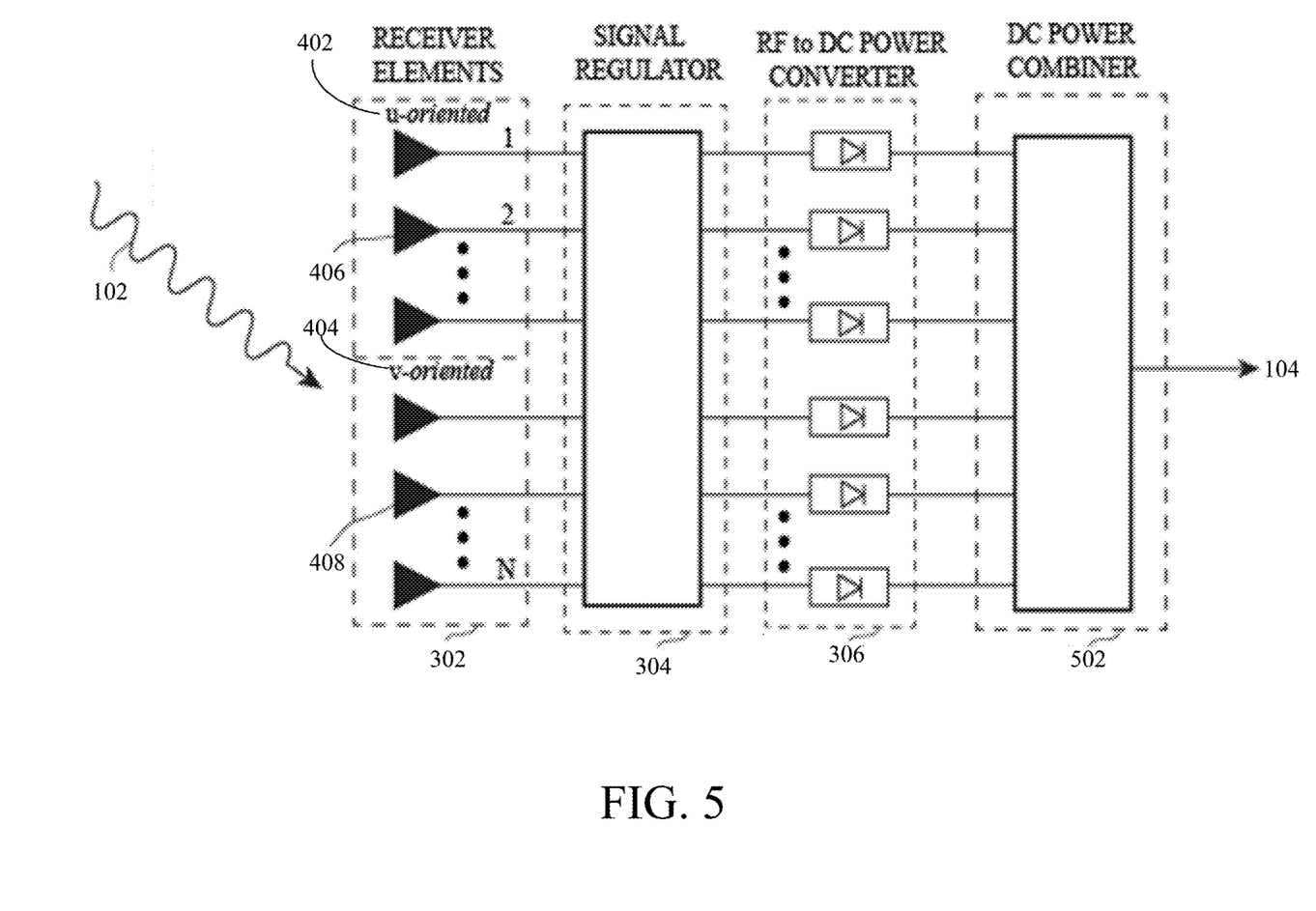
FIG. 5 is another diagram of exemplary components of a wireless radio power adapter device in accordance with an embodiment of the present disclosure.

FIG. 5 is another diagram of exemplary components of a wireless radio power adapter device in accordance with an embodiment of the present disclosure. In FIG. 5, power converter 306 of wireless radio power adapter device 100 does not combine multiple signals (e.g., from signal regulator 304) into a single power signal to be sent to power converter 306 (e.g., as in FIG. 4). In FIG. 5, wireless radio power adapter device 100 includes a power combiner (e.g., a DC power combiner) configured to combine converted signals from power converter 306 (e.g., RF signals converted to DC signals by power converter 306) into a single power signal for transmission via transmission channel 104.

Figure 6:
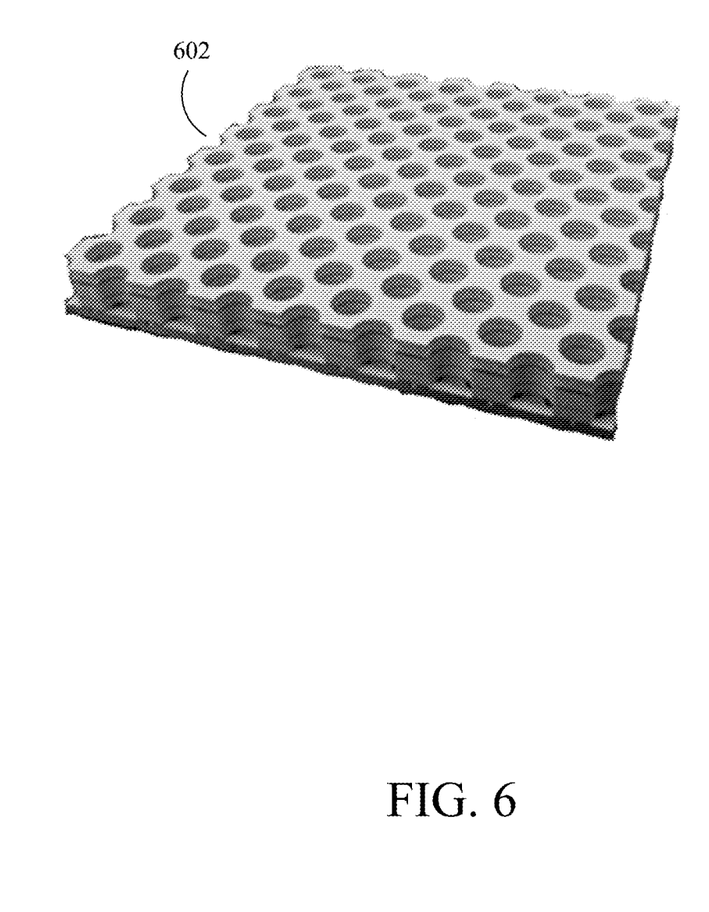
FIG. 6 shows an exemplary subarray of antenna elements in accordance with an embodiment of the present disclosure.

FIG. 6 shows an exemplary subarray of antenna elements in accordance with an embodiment of the present disclosure. For example, FIG. 6 shows an exemplary wideband subarray 602 (e.g., an ultrawideband antenna subarray, such as PUMA subarray). As discussed above, these subarrays can be modular and can be tiled in accordance with an embodiment of the present disclosure.

Figure 7:
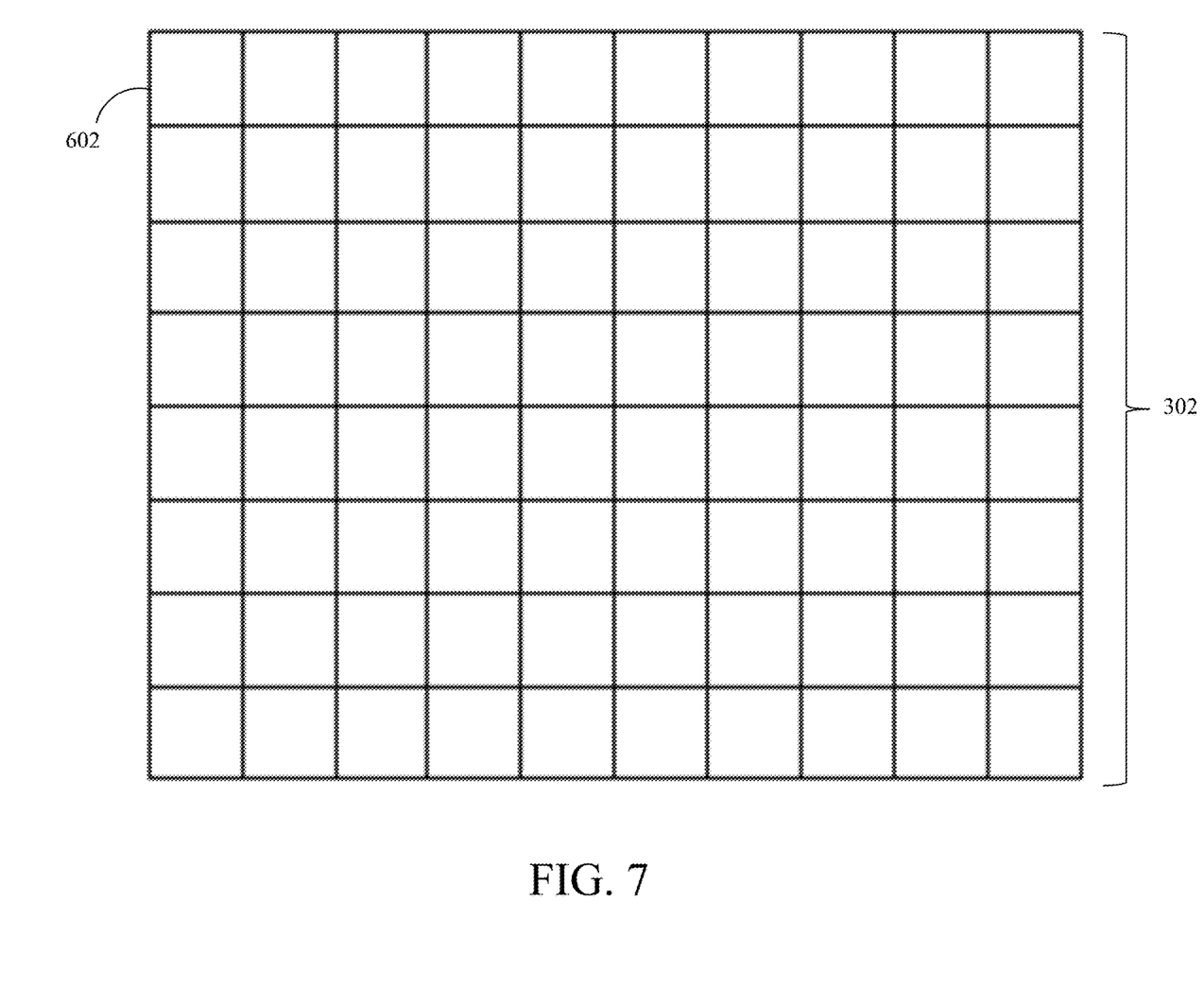
FIG. 7 is a diagram showing exemplary tiling of subarrays in accordance with an embodiment of the present disclosure.

FIG. 7 is a diagram showing exemplary tiling of subarrays in accordance with an embodiment of the present disclosure. As shown in FIG. 7, receiver elements 302 includes subarray 602. In an embodiment, each tile of receiver elements 302 is identical to subarray 602. In an embodiment, at least one tile of receiver elements 302 is different in size and/or shape from subarray 602. In an embodiment, additional subarrays 602 can be added or subtracted from receiver elements 302 based on power requirements of a powered device (e.g., electric apparatus 101).

4. Exemplary Advantages

Embodiments of the present disclosure enable wireless charging of an electronic device or transporter using signals over-the-air, thus prolonging operation of the powered device. The wideband arrays can enable more energy to be collected over a broader spectrum, in addition to relaxing transmitted signal power requirements, since the power can be instead distributed over that spectrum. In addition to their wideband performance, these arrays further provide advantages in affordability and manufacturability, are low-profile, and enable conformal flat-panel integration, thus offering many practical benefits.

Embodiments of the present disclosure can harvest ambient RF energy such that no direct wall outlet adapter line is needed. In an embodiment, a device or transporter can be charged wirelessly with an ambient RF source. In an embodiment, wireless radio power adapter device 100 is a modular RF charging accessory. In an embodiment, wireless radio power adapter device 100 can include a wideband array of elements harvesting RF power, similar to an array of solar cells (i.e., solar panel) that harvests solar energy. RF power can be less susceptible to weather conditions than solar power (e.g., it can penetrate clouds, rain, etc.)

Wide instantaneous bandwidth operation enables power over a broad range of frequencies to be simultaneously harvested, increasing the amount of potential harvested power. The average power density of the incoming wireless power can be dramatically less with a wideband array, since power is spread over a broad range of frequencies to achieve the same power density as compared to a narrowband counterpart.

In conventional power harvesting systems, the power harvester unit is inside the powered device. Embodiments of the present disclosure provide a passive, modular wireless radio accessory that can be placed inside or outside of a powered device and that can adapt ambient RF energy into usable DC power. For example, someone can plug a wireless radio power adapter device 100 in accordance with an embodiment of the present disclosure into their phone and let it sit on their desk or on-the-go in their pocket all day to prolong its battery life (or to wirelessly charge it).

In an embodiment, receiver elements 302 include a wideband array antenna. A wideband array antenna allows harvesting RF energy over a broad electromagnetic spectrum, and thus enables more potential energy. In an embodiment, this wideband array antenna can allow the same amount of power to be harvested as compared to a narrowband counterpart but with much less incoming wireless transmission power, (i.e., the transmission power is spread over a wide range of frequencies). Thus, embodiments of the present disclosure enable lower wireless power for any potential environmental concerns.

In an embodiment, the wideband antenna is also polarimetric, meaning it can sense arbitrary polarizations and does not lose transmission based upon device orientation or signal polarization. Embodiments of the present disclosure can use dual-linear polarization, leading to no loss due to polarization mismatch (i.e., polarization diverse).

In an embodiment, the wideband array antenna is designed such that it efficiently collects RF energy over a wide field of view. In an embodiment, the wideband array antenna is conformal and low-profile for flat-panel mounting and compactness. In an embodiment, array antennas are desirable because more energy can be simply be collected by making the aperture size larger, and these wideband array antennas perform well indifferent to array size.

The modularity of embodiments of the present disclosure provides further advantages. In an embodiment, the entire wireless radio power adapter device 100 is modular, and it can be plugged in to electric apparatus 101 and taken off when not needed. If wireless radio power adapter device 100 breaks, it can be popped off and replaced with a new device.

Ambient RF energy for use with embodiments of the present disclosure can be from man-made transmissions (e.g., radio broadcasts, cell phones, etc.) or from intentionally-placed short- or long-range transmitters for the explicit purpose of wireless charging. Embodiments of the present disclosure can be ground plane (cavity-backed) for shielding behind the array. In an embodiment, wireless radio power adapter device 101 can see (scan) out to +/−45 degrees from boresight in all scan planes. In an embodiment, wireless radio power adapter device 100 can see (scan) out to +/−60 degrees from boresight in all scan planes. In an embodiment, a hydrophobic radome (or other protective cover) can be incorporated into an embodiment of the present disclosure for additional protection.

5. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A wireless radio power adapter device, comprising:
a receiver element comprising a plurality of antenna subarrays, wherein the receiver element is configured to receive a radio frequency (RF) signal and to generate a harvested signal, wherein the receiver element includes a wideband antenna configured to receive signals having greater than a 3:1 bandwidth ratio;
a signal regulator, coupled to the receiver element, configured to filter the harvested RF signal and to generate a filtered signal; and
a power converter, coupled to the signal regulator, configured to convert the filtered signal into a power format useable by a powered device, wherein each antenna subarray in the plurality of antenna subarrays is configured to be modularly tiled in the receiver element based on power requirements of the powered device without disrupting performance of the receiver element.

2. The wireless radio power adapter device of claim 1, further comprising a plurality of receiver elements including the receiver element, wherein the plurality of receiver elements further comprise:
a u-oriented receiver element configured to sense a u-oriented signal, and
a v-oriented receiver element configured to sense a v-oriented signal, where the u-oriented signal and the v-oriented signal have with orthogonal orientations.

3. The wireless radio power adapter device of claim 1, further comprising:
a power combiner, coupled to an output of the power converter, configured to combine power signals from the power converter into a single signal.

4. The wireless radio power adapter device of claim 1, further comprising:
a power combiner, coupled to an output of the signal regulator, configured to:
combine power signals from the signal regulator into a single signal, and
transmit the combined power signals to the power converter.

5. The wireless radio power device of claim 1, wherein the receiver element is configured to scan out to +/−45 degrees from boresight in all scan planes.

6. The wireless radio power device of claim 1, wherein the receiver element is configured to scan out to +/−60 degrees from boresight in all scan planes.

7. The wireless radio power adapter device of claim 1, wherein each antenna subarray in the plurality of antenna subarrays is configured to be modularly tiled in the receiver element such that each antenna subarray in the plurality of antenna subarrays is positioned adjacent to, and is directly coupled to, one or more additional antenna subarrays in the plurality of antenna subarrays.

8. The wireless radio power adapter device of claim 7, wherein each antenna subarray in the plurality of antenna subarrays is configured to be modularly tiled in the receiver element such that the plurality of antenna subarrays form a tiled block of antenna subarrays.

9. The wireless radio power adapter device of claim 8, wherein each antenna subarray in the plurality of antenna subarrays has the same size and shape.

10. The wireless radio power adapter device of claim 8, wherein a first antenna subarray in the plurality of antenna subarrays has a different size than a second antenna subarray in the plurality of antenna subarrays.

11. A system, comprising:
   a wireless radio power adapter device, comprising:
      a receiver element comprising a plurality of antenna subarrays, wherein the receiver element is configured to receive a radio frequency (RF) signal and to generate a harvested signal, wherein the receiver element includes a wideband antenna configured to receive signals having greater than a 3:1 bandwidth ratio,
      a signal regulator, coupled to the receiver element, configured to filter the harvested RF signal and to generate a filtered signal, and
      a power converter, coupled to the signal regulator, configured to convert the filtered signal into a power format useable by a device to be powered by the wireless radio power adapter device, wherein each antenna subarray in the plurality of antenna subarrays is configured to be modularly tiled in the receiver element based on power requirements of the device without disrupting performance of the receiver element; and
   an electric apparatus configured to receive power from the wireless radio power adapter device.

12. The system of claim 11, wherein the electric apparatus further comprises:
   a power bin interface configured to receive the power from the wireless radio power adapter device;
   a power bin, coupled to the power bin interface, configured to store the received power; and
   a power using component configured to use power from the power bin.

13. A wireless radio power adapter device, comprising:
   a receiver element comprising a plurality of antenna subarrays, wherein the receiver element is configured to:
      scan out to +/−45 degrees from boresight in all scan planes,
      receive signals having greater than a 3:1 bandwidth ratio, and
      generate harvested power from the received signals; and
   a power converter, coupled to the receiver element, configured to convert the harvester power into a format useable by a powered device, wherein each antenna subarray in the plurality of antenna subarrays is configured to be modularly tiled in the receiver element based on power requirements of the powered device without disrupting performance of the receiver element.

14. The wireless radio power adapter device of claim 13, wherein the receiver element is configured to scan out to +/−60 degrees from boresight in all scan planes.

15. The wireless radio power adapter device of claim 13, further comprising a plurality of receiver elements including the receiver element, wherein the plurality of receiver elements further comprise:
   a u-oriented receiver element configured to sense a u-oriented signal, and
   a v-oriented receiver element configured to sense a v-oriented signal, where the u-oriented signal and the v-oriented signal have with orthogonal orientations.

16. The wireless radio power adapter device of claim 13, wherein each antenna subarray in the plurality of antenna subarrays is configured to be modularly tiled in the receiver element such that each antenna subarray in the plurality of antenna subarrays is positioned adjacent to, and is directly coupled to, one or more additional antenna subarrays in the plurality of antenna subarrays.

17. The wireless radio power adapter device of claim 16, wherein each antenna subarray in the plurality of antenna subarrays is configured to be modularly tiled in the receiver element such that the plurality of antenna subarrays form a tiled block of antenna subarrays.

18. The wireless radio power adapter device of claim 16, wherein each antenna subarray in the plurality of antenna subarrays has the same size and shape.

19. The wireless radio power adapter device of claim 16, wherein a first antenna subarray in the plurality of antenna subarrays has a different size than a second antenna subarray in the plurality of antenna subarrays.

20. The wireless radio power adapter device of claim 16, wherein the plurality of antenna subarrays comprise a plurality of Planar Ultrawideband Modular Antennas (PUMAs).

* * * * *